United States Patent [19]

Robertson et al.

[11] Patent Number: 4,598,654
[45] Date of Patent: Jul. 8, 1986

[54] FURROW OPENER AND FOLLOWER BLADE

[75] Inventors: Forrest E. Robertson; Donald E. Williams, both of Garden City, Kans.

[73] Assignee: Acra-Plant, Inc., Garden City, Kans.

[21] Appl. No.: 597,118

[22] Filed: Apr. 5, 1984

Related U.S. Application Data

[63] Continuation-in-part of Ser. No. 336,270, Dec. 31, 1981, abandoned, which is a continuation-in-part of Ser. No. 118,618, Feb. 4, 1980, abandoned.

[51] Int. Cl.$^4$ .............................................. A01C 7/20
[52] U.S. Cl. ..................................................... 111/88
[58] Field of Search .................................. 111/85–88, 111/3, 73, 2; 172/575, 574, 604, 540, 545, 555, 156, 159, 184, 185

[56] References Cited

U.S. PATENT DOCUMENTS

| | | | |
|---|---|---|---|
| 2,192,947 | 3/1940 | White | 111/88 |
| 3,005,426 | 10/1961 | Sorensen et al. | 111/85 X |
| 3,154,030 | 10/1964 | Williams | 111/1 |
| 3,217,674 | 11/1965 | Williams | 111/86 |
| 3,380,411 | 4/1968 | Orendorff | 111/63 |
| 3,380,412 | 4/1968 | Connor et al. | 111/63 |
| 3,509,947 | 5/1970 | Garst | 172/721 |
| 3,658,018 | 4/1972 | Connor | 111/88 |

FOREIGN PATENT DOCUMENTS

| | | | |
|---|---|---|---|
| 306806 | 8/1971 | U.S.S.R. | 111/88 |
| 475972 | 11/1975 | U.S.S.R. | 111/87 |
| 572237 | 11/1977 | U.S.S.R. | 111/88 |
| 858609 | 8/1981 | U.S.S.R. | 111/88 |

*Primary Examiner*—Robert A. Hafer
*Assistant Examiner*—Danton DeMille
*Attorney, Agent, or Firm*—Schmidt, Johnson Hovey & Williams

[57] ABSTRACT

A pair of circular, furrow-opening disks, supported by separate, angularly oriented axles, rotatable simultaneously as a unit and converging to a leading zone of interengagement within the ground for preventing soil buildup therebetween, have a wedge-shaped, trailing blade, rigidly supported therebetween immediately ahead of materials gravitating into the furrow, and following at a greater depth, for slicing the series of unplowed scallops at the bottom of the furrow, clearing the furrow bottom of loose soil and forming a truly V-shaped, ridgeless, material-receiving apex compressed into a smooth, firm sidewall formation.

23 Claims, 18 Drawing Figures

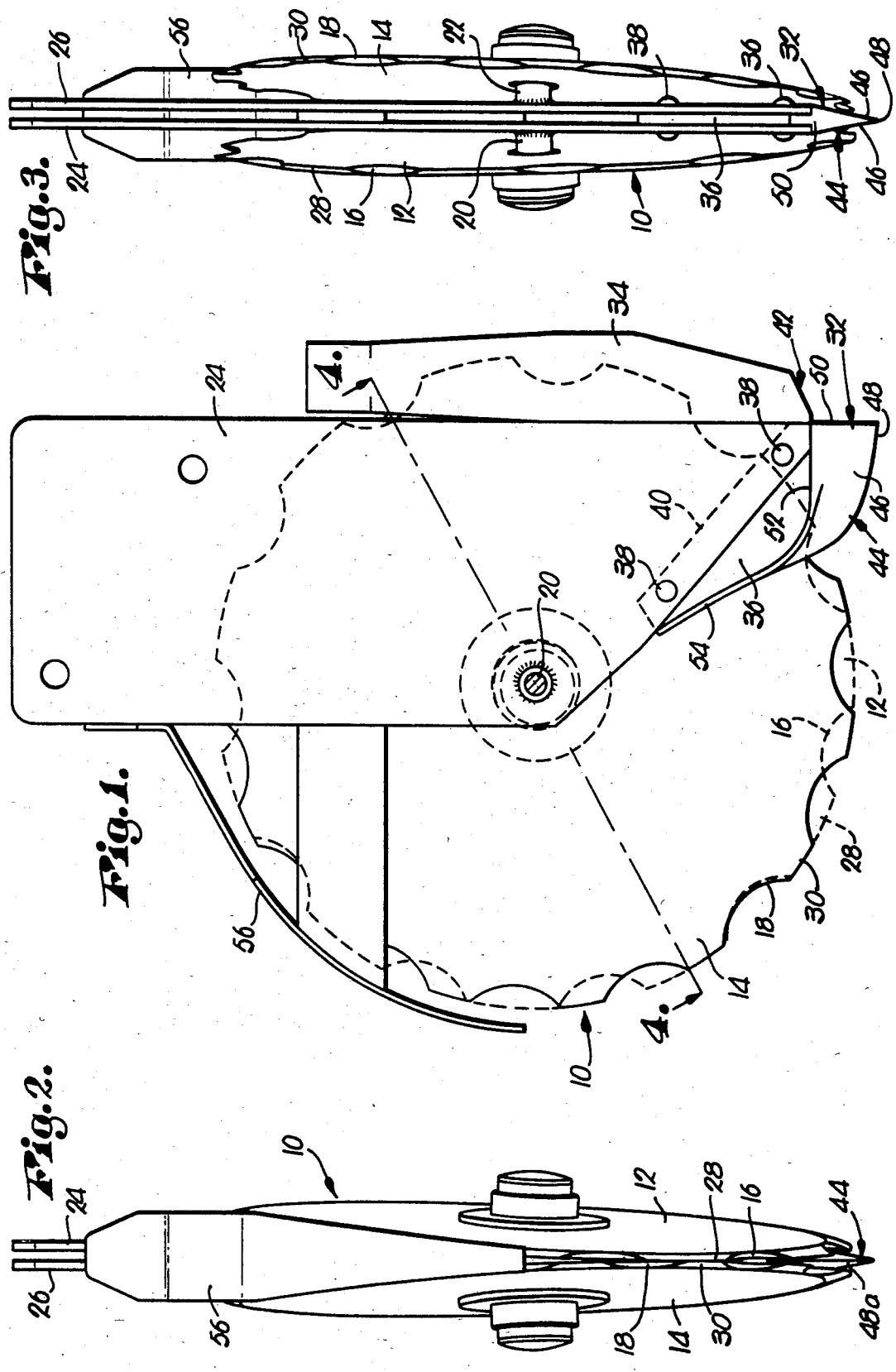

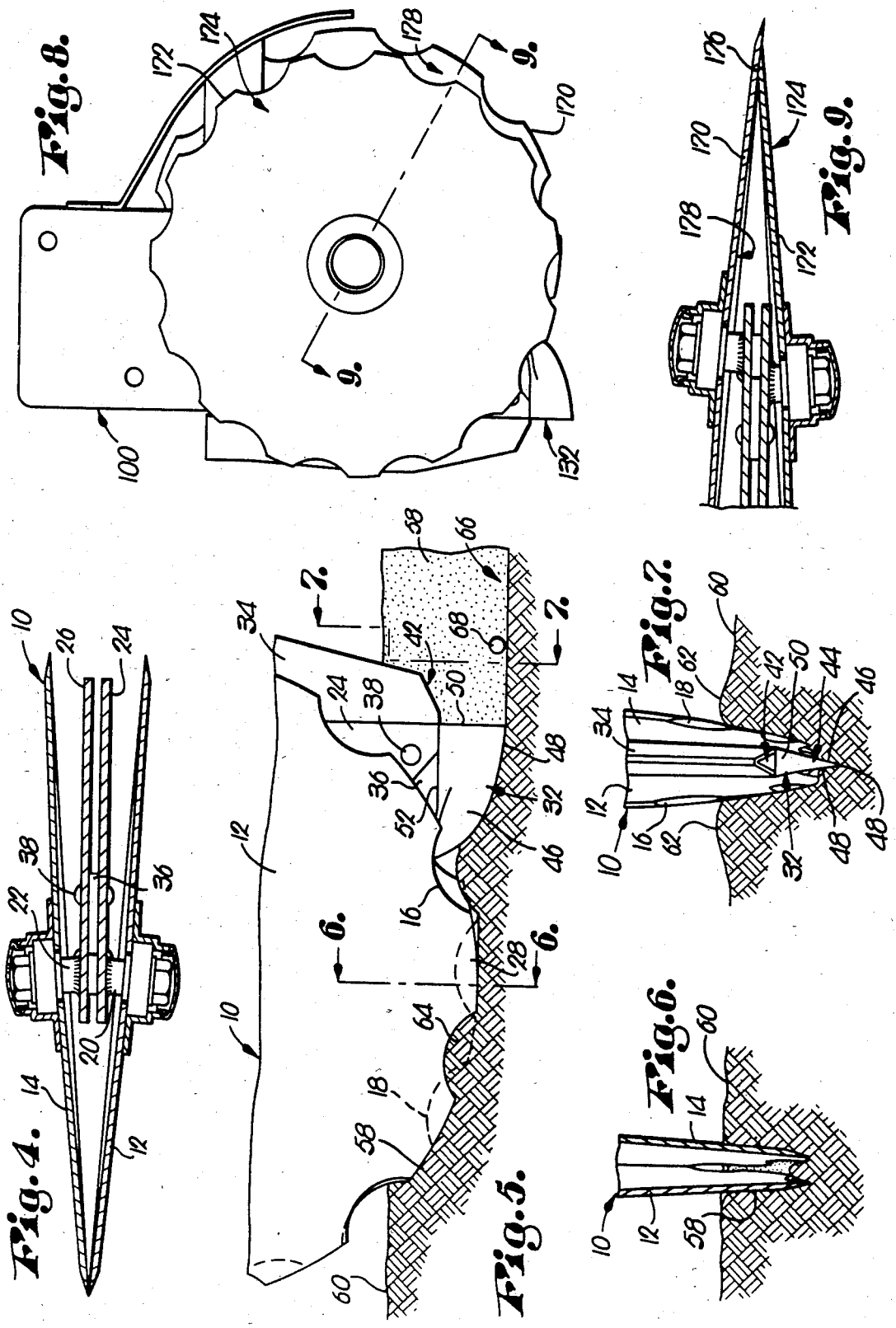

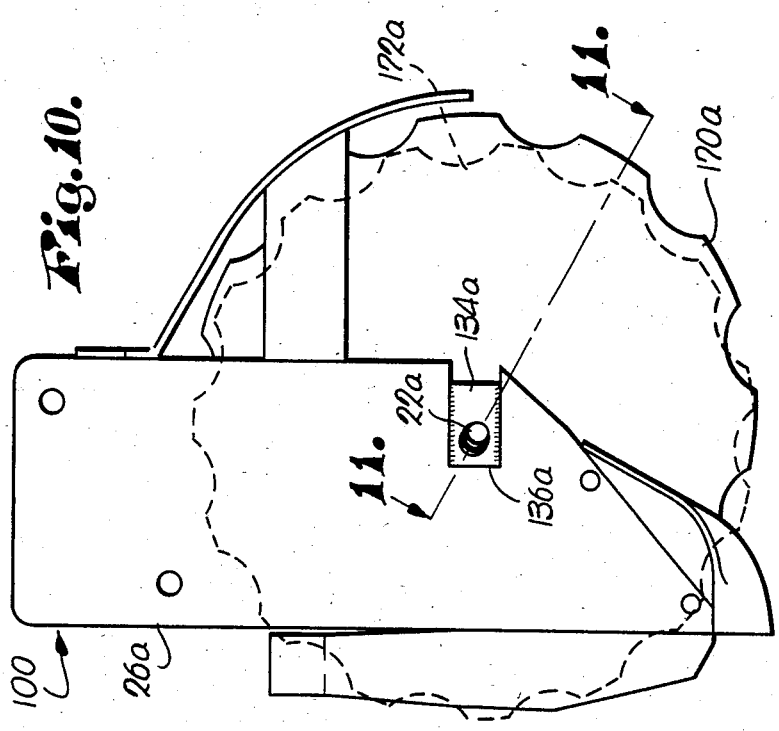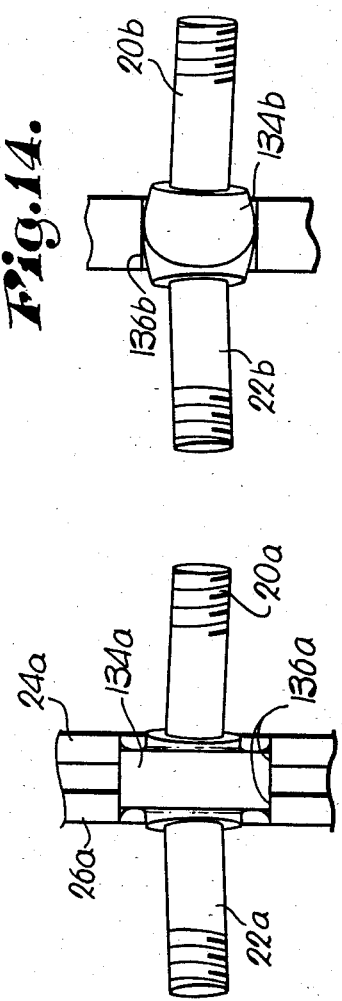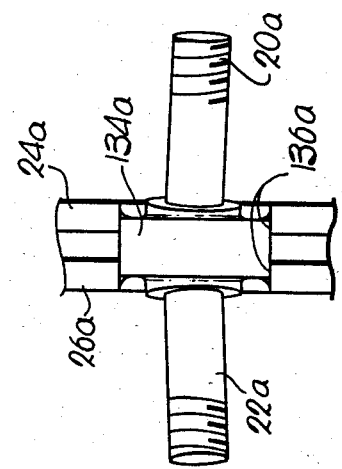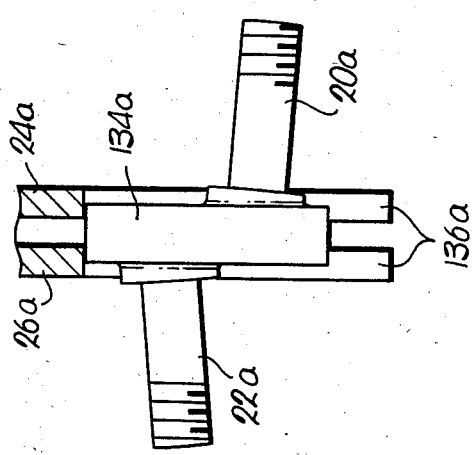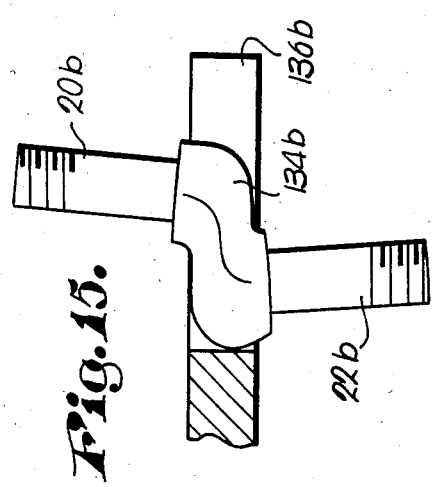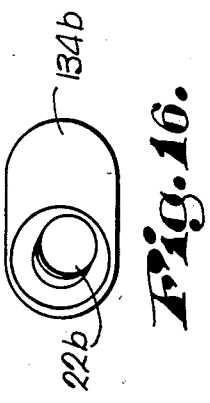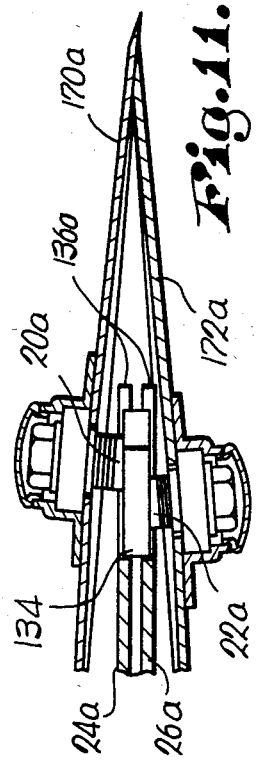

FURROW OPENER AND FOLLOWER BLADE

This is a continuation-in-part of our co-pending application Ser. No. 06/336,270 filed Dec. 31, 1981 which was, in turn, a continuation-in-part of our appliction Ser. No. 06/118,618 filed Feb. 4, 1980, both now abandoned.

Proper depositing of materials into the ground, particularly seeds, requires special care within the furrow in order to orient the materials within the furrow to the best advantage. Conventionally, this has either been accomplished by use of certain types of furrow-opening runners or attempted, without success, by furrow-opening disks. The disk approach has the disadvantage of soil buildup therebetween, and is even more problematical because the disks produce conditions at the bottom of the furrow which are wholly unacceptable. Suggestions for solving the long-existing problems have included so-called balk removers for use in conjunction with the disks in an effort to press loose soil downwardly along the bottom of the furrow, but the results have not been satisfactory. Accordingly, there is a dire need for permitting the use of furrow-opening disks while, at the same time, forming the proper furrow apex made possible by the aforementioned furrow-opening runners.

In accordance with our present invention, the soil buildup problem is solved by a scissors-like, shearing action wherein the cutter disks are inclined forwardly and downwardly such that they interengage at the angle of attack with the ground and open sufficiently to clear the furrow forming follower as well as the materials discharge tube therebehind. Good results appear by use of disks having equal diameters, with an odd number of peripheral notches provided in each disk and with one disk having a greater number of notches with narrower islands therebetween than the other disk such that the notches do not normally align or become synchronized. Each disc may, however, have an even number of notches.

The ground driven disks rotate simultaneously, freely about their respective axels and at the same speed. By beveling one face of each disk at its peripheral margin to present a sharp cutting edge, the ground and crop residue or other debris are adequately severed and pushed aside laterally, such action increasing the frictional pressure at the zone of interengagement. In one form of our invention the flat inner faces of the disks are in contact with each other at their lower leading edges; in a modified form the disks are offset, with the trailing disk reversed such that a bevelled circumferential length thereof is held in frictional engagement with the flat inner face of the leading disk by squeezing pressure against the sides of the furrow.

The interchangeable disks require to scrapers therebetween, leave no balk to be removed and form a series of unplowed scallops of various sizes along the bottom of the furrow that are split and pressed laterally by a slicer in the form of a wedge-shaped follower blade disposed at a depth greater than the maximum penetration of the disks. The blade smoothes and firms up the lower sidewalls of the furrow, eliminates accumulation of loose soil therewithin and presents a truly V-shaped furrow apex devoid of ridges such that the discharged materials are deposited at equal depths along the narrowest stretch of the furrow. Elongated seeds are planted with their longitudinal axes parallel with the furrow rather than falling at random unoriented and at differing depths.

The seeds are deposited into the single, deep, trash-free trench line at the bottom or apex of the furrow immediately behind the blade, at which moment the previously compressed sidewalls spring back inwardly to tightly pack and encapsulate the seeds in almost total absence of air pockets which would otherwise occur in the presence of loose, dry soil around the seeds.

The construction of the assembly is such as to permit satisfactory operation under various climatic conditions, narrow rows and deep, heavy residues or other trash on and within the ground. Good results can also be expected in all types of soils, whether firm, heavy, wet and sticky as in many loams, clays, silts and gumbos, or loose, and oftentimes dry, sandy or rocky situations.

With the seeds embedded between the moist, solid sidewall surfaces of the furrow, all of the essential environmental conditions affecting and stimulating early development are presented. The seeds germinate quickly and begin to put out strong, healthy plant-anchoring rootstock which immediately draws water and nourishment from the soil and becomes fixed in the ground. The young, hardy sprout growth is, therefore, properly fed and promoted such that the resulting plant continues to thrive in substantial resistance to any of the adverse elements which otherwise adversely affect proper growth.

Examples of the highly successful runners above mentioned are disclosed in the following U.S. patents:

U.S. Pat. No. 3,154,030, Williams, 10/1964. U.S. Pat. No. 3,217,674, Williams, 11/1965. U.S. Pat. No. 3,509,947, Garst, 5/1970.

Examples of efforts to resolve the problems incident to double disk furrow openers are set forth in the following U.S. patents:

U.S. Pat. No. 3,380,411, Orendorff, 4/1968. U.S. Pat. No. 3,380,412, Connor et al. 4/1968. U.S. Pat. No. 3,658,018, Connor, 4/1972.

In the drawings:

FIG. 1 is a side elevational view of one embodiment of a furrow opener and follower blade made pursuant to our present invention showing the proximal disk in dotted lines;

FIG. 2 is a front elevational view thereof;

FIG. 3 is a rear elevational view thereof absent the discharge tube;

FIG. 4 is a fragmentary cross-sectional view taken on line 4—4 of FIG. 1;

FIG. 5 is a partial side elevational view thereof showing the same in the ground during use;

Figure 18:
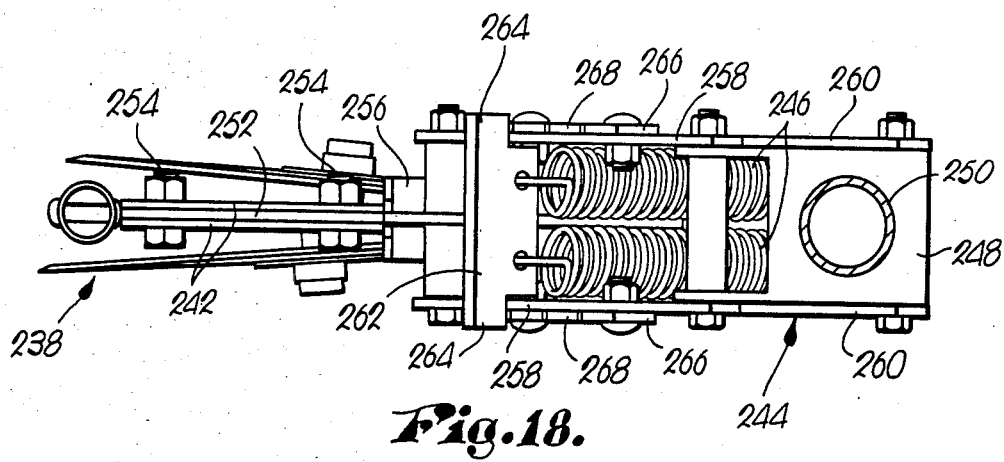
Figure 17:
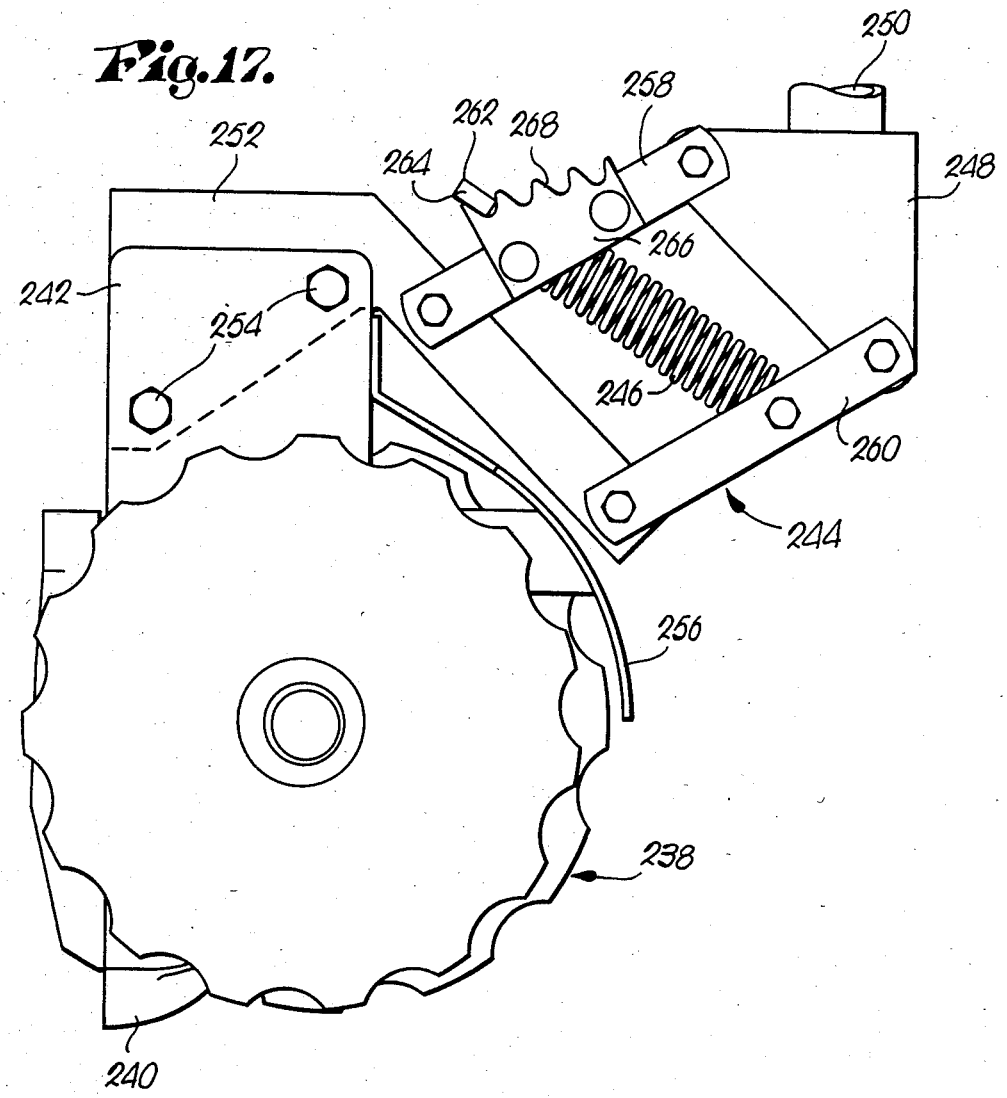

FIGS. 6 and 7 are fragmentary cross-sectional views taken along line 6—6 and 7—7 respectively of FIG. 5;

FIG. 8 is a view similar to FIG. 1 on a smaller scale of a modified form of our present invention showing the side opposite to FIG. 1;

FIG. 9 is a fragmentary cross-sectional view taken on line 9—9 of FIG. 8;

FIG. 10 is a view similar to FIG. 8 showing another embodiment of our present invention;

FIG. 11 is a fragmentary cross-sectional view taken on line 11—11 of FIG. 10;

FIG. 12 is a view showing one angle of inclination of the axles of FIGS. 10 and 11;

FIG. 13 is a view showing another angle of inclination of the axles of FIGS. 10–12;

FIG. 14 is a view similar to FIG. 12 showing a further embodiment of the instant invention;

FIG. 15 is a view showing another angle of inclination of the axles of FIG. 14; and FIG. 16 is a perspective view showing the casting and one axle of the embodiment of FIGS. 14 and 15;

FIG. 17 is a view similar to FIGS. 8 and 10 showing a linkage arrangement for attaching the opener-blade embodiments of the instant invention to a farm implement; and FIG. 18 is a top plan view of the assembly shown in FIG. 17.

In the embodiment of FIGS. 1–7, a furrow opener 10 includes a pair of disks 12 and 14 of fifteen inch diameters having circular peripheries interrupted by a series of equally spaced notches 16 and 18 respectively. The disks 12 and 14 are freely rotatable as a unit about corresponding stub axles 20 and 22 carried by spaced, upstanding plates 24 and 26 respectively, in turn capable of suspension from a farm implement frame (not shown).

As shown, eleven notches are provided in the disk 16 and fifteen notches are provided in the disk 18. While the diameters of the disks 12 and 14 are not absolutely critical, best results are obtained if they range from about 12 to 20 inches. Also, while the sizes and numbers of the notches 16 and 18 may be varied for best results, there should be an odd number of notches 16 and 18 in the disks 12 and 14. The disks 12 and 14 have a series of islands 28 and 30 alternating with the notches 16 and 18 and it is preferred that the islands 28 be wider than the islands 30.

While the inner faces of the disks 16 and 18 are flat and smooth, they are bevelled throughout their outer peripheral margins to present sharp circumferential cutting edges along all of the notches 16, 18 and along all the islands 28, 30.

The axles 20 and 22 are directly opposed but angled oppositely in two directions so as to orient the disks 12 and 14 such that they converge forwardly and downwardly, with their inner faces coming into tight frictional interengagement at their angle of attack with the ground at the lower leading extremities of the disks 12 and 14. That is to say, during simultaneous rotation of the disks 12 and 14 together as a unit, they are clamped together as they enter the soil and commence separation prior to leaving the soil with the maximum spacing disposed diametrically opposite the zone of relative contact located at the upper trailing extremities of the disks 12 and 14. The spacing is such as to clear a slicer blade 32 (hereinafter described in detail) and a tube 34 disposed for discharge of seeds or other materials into the furrow directly behind the blade 32.

The axles 20 and 22 are arranged to cause the disks 12 and 14 at the time of assembly to interengage, presenting a face-to-face contact rather than a mere line or point contact therebetween. As the disks 12 and 14 are placed in use to open the initial furrow, the sidewalls of the furrow will tend to exert pressure on the disks 12 and 14 with a tightness of interengagement such as to prevent substantial relative rotation as they are ground driven through the field.

The blade 32 has a web 36 releasably suspended from the plates 24, 26 therebetween by fasteners 38. The disks 12, 14 partially straddle the blade 32 at their lower rear extremities and the rear end of upper, inclined edge 40 of the blade 32 terminates just above the lower discharge outlet 42 of the tube 34.

Beneath the web 36, the replaceable blade 32 has an essentially wedge-shaped slicer 44 integral with the web 36, presenting slightly concave sides 46 that taper towrd a sharp, convex cutting edge 48 which extends forwardly from a rearmost, flat upright end 50 of the slicer 44, such end 50 being immediately ahead of the outlet 44. The sides 46 also converge forwardly such as to present a sharp, leading continuation 48a of the edge 48.

The rear end of the upper face 52 of the slicer 44 abuts the plates 24, 26. An elongated, leading soil deflector 54 between the disks 12, 14 extends upwardly and forwardly from the convex cutting edge 48. The deflector 54 terminates above ground level and is integral with the web 36 rendering the latter T-shaped. An arcuate, somewhat V-shaped, leading debris deflector 56 is supported by the plates 20, 22 forwardly of the upper leading extremities of the disks 12, 14.

In operation, as the implement advances through the field, with the deflector 56 leading, an initial furrow 58 is formed by the opener 10, the disks 12, 14 operating to part the soil below ground level 60 to a preselected depth. The cutting edges of the disks 12, 14 not only sever the soil but slice through all crop residue and other debris, pushing it aside and leaving it in place as much in the form of mounds 62 above ground level 60 on each side of the furrow 58. The furrow 58 is, therefore, free of all such extraneous material ahead of the blade 32.

Inasmuch as the disks 12, 14 are in relatively tight interengagement when in the soil, dirt and debris cannot enter between the disks 12, 14 at the zone of intercontact, but as the disks 12, 14 flex apart, all soil which may tend to collect therebetween before they leave the ground is sheared away in the scissors-like action, augmented by the deflector 54.

As the disks 12, 14 "walk" along they leave a series of unplowed scallops 64 of differing sizes along the bottom of the furrow 58, keeping in mind the fact that the notches 16 seldom or almost never align directly and fully with notches 18. Those scallops 64 are then split by the slicer 44 whose maximum penetration is from $\frac{3}{8}''$ to 1" or more deeper than the depth of penetration of the disks 12, 14.

As a result, no balk or "W" shaped configuration is left in the furrow 58; instead, a truly V-shaped apex is formed having sidewalls that are firmed and smoothed by the sides 46 of the slicer 48 and compressed laterally by the action of the latter. The very bottom 66 of the furrow apex forms a straight line free of loose soil as is best suited for reception of material (such as seeds, fertilizer, herbicides, insecticides, etc.) from the tube 34, as noted in FIG. 5, in the case of seeds 68.

The materials are dropped behind the end 50 of the slicer 44 while the walls of the furrow 58 are still parted at its apex, and as such compressed furrow walls spring back, the materials are gripped and encapsulated by the firm, moist ground, free of air pockets. In the case of elongated seeds 68, the V-shaped furrow configuration orients such seeds so that their longitudinal axes align with the bottom 66, resulting in a uniform growth pattern of the plants subsequently developing above the ground level 60.

In FIGS. 8 and 9, an opener 100 and a corresponding blade 132, as well as all other components, are much the same as the embodiment of FIGS. 1–8. The differences include offsetting of the disks 170 and 172 such as to dispose the disk 170 ahead of the disk 172 and reversing the disk 172 such that its flat surface 174 faces outwardly. This places a flat, beveled area 176 of the disk 172 into engagement with flat inner surface 178 of the disk 170 during each cycle of revolution of the disks 170 and 172. Whether the disk having the greater or the lesser number of notches leads the other disk is of no consequence, but better results are usually expected when the leading disk 170 has the greater number of notches. Hence, the disc 172 may be placed ahead of the disc 170, as distinguished from the arrangement shown in FIGS. 8 and 9.

As the result of such modifications, a greater surface area of interengagement is presented, thereby avoiding grooving and other disfigurement of the inner faces of the disks. Otherwise, the operation and end results are the same as hereinabove described.

In both embodiments, differing portions of the disks constantly interengage during rotation so that such wear as takes place is circumferentially uniform throughout their inner faces. Moreover, in both forms the flexing action between the disks to continuously prevent dirt buildup therebetween occurs both as the disks come together and as they begin to separate.

The free rotation and proper penetration of the disks as promoted by their notches, are not impeded as in instances where a scraper blade is needed therebetween, and the "finger action" of the notches operates to either depress or push aside all trash out of the path of the trailing slicer blade. The resulting mounds 62 minimize erosion and maximize moisture retention, allowing more moisture to enter the soil with less evaporation.

In the embodiments of our invention shown in FIGS. 10-16 the disks, as above explained, converge both forwardly and downwardly, although separate stub axles 20 and 22 are not employed. Hence, axles 20a and 22a in FIGS. 10-13 as well as axles 20b and 22b in FIGS. 14-16 are angled oppositely in two directions the same as above described with respect to axles 20 and 22. Here again, the disk 172b may lead the disk 172a if desired.

However, the axles 20a and 22a are rigidly connected to a block 134a therebetween. The block 134a may span the distance between the plates 24a and 26a and be welded to the latter within slots 136a provided in plates 24a and 26a.

In FIGS. 14-16 the axles 20b and 22b are integral with a casting 134b welded in an opening 136b of a suspension member therefor.

Thus, disks 170a and 172a axles 20a and 22a converge forwardly and downwardly, and disks (not shown) on axles 20b and 22b also converge forwardly and downwardly. The same arrangements of FIGS. 10-16 may be employed with disks 12 and 14.

It is to be understood that the arrangement of the stub axles as shown in FIGS. 9 and 11 may also be preferred in the embodiment of FIG. 4 in lieu of the disposition of axles 20 and 22 as shown in FIG. 4.

In FIGS. 17 and 18 a furrow opener 238 with its blade 240 and its upstanding plates 242 may be essentially the same as any one of the embodiments above described, and incorporated therewith is a parallel linkage arrangement 244 together with a pair of springs 246 associated with the linkage 244. The linkage 244 is interposed between a triangular mount 248 having an upstanding suspending post 250 (which may be rotatable about a vertical axis, if desired) and a somewhat L-shaped arm 252. The arm 252 is clamped by bolts 254 between the plates 252 and extends downwardly and forwrdly above front deflector 256.

The linkage 244 includes a pair of upper links 258 and a pair of lower links 260 all pivotally connected to the mount 248 and to the arm 252 for up and down swinging movement but yieldably biased downwardly by the springs 246. Each link 260 has one of the springs 246 connected thereto intermediate the ends of the links 260. The opposited ends of the springs 246 are connected to a cross bar 262 having end lugs 264 overlying the links 258. Each link 260 is provided with a plate 266 having notches 268 for receiving the lugs 264.

The linkage 244 assures as up and down movement of the unit 238 over uneven terrain that is essentially vertical with the upper edges of the plates 242, the arm 252 and the amount 248 remaining horizontal whenever the upright axis of the post 250 is vertical. After the unit 238 rises above normal a short distance, e.g. 1½0 inches, there is a decreasing moment arm wherein the resistance to upward movement by the springs 246 no longer increases, at least until the rise is about 8 inches above normal. It is contemplated, for example, that the total vertical travel of the unit 238 be about 10 inches. Manifestly, the force exerted by the springs 246 may be varied by selection of the notches 268 within which the lugs 264 are seated.

We claim:

1. In a farm implement, a furrow opener having:
   a pair of metallic, upright, forwardly and downwardly converging, earth penetrating, plate-like disks having circular peripheries; and
   a stub axle rotatably supporting each disk respectively;
   said axles being disposed along axes inclined forwardly and downwardly at angles which hold a portion of the inner face of one of the disks in engagement with a portion of the inner face of the other disk at the lower leading edge of said one disk,
   the disks being otherwise spaced apart throughout the peripheries thereof,
   said disks being peripherally notched, presenting each disk with a series of notches and a series of teeth alternating with the notches.
   there being a greater number of notches on one disk than on the other disk whereby to preclude alignment of the notches of said one disk with the notches of said other disk at the zone of said engagement.

2. The invention of claim 1, the zone of said engagement being disposed at the peripheries of both disks.

3. The invention of claim 1, said one disk being disposed in trailing relationship to said other disk and the zone of engagement being disposed inwardly of the periphery of said other disk.

4. The invention of claim 3, said one disk having a beveled margin on its inner face along its periphery, said margin engaging the inner face of said other disk.

5. The invention of claim 1, the disks being disposed for effecting interengagement as a furrow is opened thereby.

6. The invention of claim 1; and a follower blade having an essentially wedge-shaped slicer disposed to advance along the furrow opened by said disks at the apex of the furrow below the level of earth penetration by said disks.

7. The invention of claim 6, said blade having a mounting web integral with said slicer and extending upwardly therefrom.

8. The invention of claim 6, said slicer having a trailing end and a pair of sides tapered toward a sharp, convex cutting edge extending upwardly and forwradly from said end and terminating between the disks.

9. The invention of claim 8, said blade having an elongated, leading deflector disposed between the disks and extending upwardly and forwardly from said edge.

10. In a farm implement as set forth in claim 1 and, a follower blade including:
   an essentially wedge-shaped, furrow-receiving slicer having a trailing end and a pair of sides tapered toward a sharp cutting edge extending upwardly and forwardly from said end; and
   an elongated, leading deflector extending upwardly and forwardly from said edge.

11. The invention of claim 10, said blade having a web integral therewith and extending upwardly therefrom.

12. The invention of claim 11; and a pair of upright plates, said web having releasable fasteners attaching the web to the plates therebetween.

13. The invention of claim 12, said disks partially overlapping the blade.

14. The invention of claim 13; and a pair of disk-supporting plates, said web being attached to the plates.

15. In a farm implement, a furrow opener having:
   a pair of metallic, upright, rotatable, forwardly and downwardly converging, earth penetrating, plate-like disks having circular peripheries,
   the axes of rotation of the disks being inclined forwardly and downwardly at angles which hold a portion of the inner face of one of the disks in engagement with a portion of the inner face of the other disk at the lower leading edge of said one disk,
   whereby the disks rotate together as a unit to maintain the disks free of dirt collection on said inner faces thereof,
   the disks being otherwise spaced apart throughout the peripheries thereof,
   at least one of the disks being peripherally notched, presenting a series of notches and a series of islands alternating with the notches,
   both disks being peripherally notched with each disk having a series of notches and a series of islands alternating with the notches,
   one disk having a greater number of notches than the other disk.

16. The invention of claim 15 wherein the islands of said one disk are narrower than the islands of the other disk.

17. The invention of claim 15; and a stub axle rotatably supporting each disk respectively.

18. The invention of claim 15; a block between the disks; and a pair of oppositely extending axles secured to the block and rotatably supporting the disks.

19. The invention of claim 15; and parallel linkage supporting the opener for up and down, rectilinear movement.

20. The invention of claim 19; and resilient means connected with said linkage for yieldably biasing the opener downwardly.

21. The invention of claim 20, there being a pair of upper links and a pair of lower links, all normally inclined downwardly and rearwardly toward the opener; means pivotally supporting the links at their leading, normally uppermost ends; and means secured to the opener and pivotally receiving the links at their trailing, normally lowermost ends.

22. The invention of claim 21, said resilient means including a first tension spring connecting one lower link with a corresponding upper link, and a second tension spring interconnecting the remaining links, the springs being normally inclined upwardly and rearwardly as the opener is approached.

23. The invention of claim 22, and a lug and notch assembly for varying the tension of the springs.

* * * * *